(12) United States Patent
Okumoto

(10) Patent No.: US 7,787,051 B2
(45) Date of Patent: Aug. 31, 2010

(54) VIDEO DISPLAY APPARATUS AND VIDEO DISPLAY METHOD

(75) Inventor: Hideaki Okumoto, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/484,803

(22) Filed: Jun. 15, 2009

(65) Prior Publication Data

US 2010/0053425 A1    Mar. 4, 2010

(30) Foreign Application Priority Data

Aug. 29, 2008    (JP) .............................. 2008-221479

(51) Int. Cl.
*H04N 7/00* (2006.01)
*H04N 11/00* (2006.01)
*H04N 3/27* (2006.01)

(52) U.S. Cl. .................... 348/552; 348/553; 348/554

(58) Field of Classification Search ......... 348/441–459, 348/553–570, 625–631
See application file for complete search history.

(56) References Cited

U.S. PATENT DOCUMENTS

| | | | |
|---|---|---|---|
| 6,285,804 | B1 | 9/2001 | Crinon et al. |
| 6,480,630 | B1 * | 11/2002 | Kondo .......................... 382/240 |
| 6,851,116 | B1 | 2/2005 | Yoshikawa |
| 7,224,402 | B2 * | 5/2007 | Cho ............................ 348/558 |
| 7,542,097 | B2 * | 6/2009 | Suito ........................... 348/555 |
| 2007/0269137 | A1 | 11/2007 | Ida et al. |
| 2008/0107356 | A1 | 5/2008 | Matsumoto et al. |
| 2008/0146333 | A1 | 6/2008 | Kando et al. |

FOREIGN PATENT DOCUMENTS

| | | |
|---|---|---|
| JP | 10-028260 | 1/1998 |
| JP | 2000-188680 | 4/2000 |
| JP | 2000-307594 | 11/2000 |
| JP | 2001-014119 | 1/2001 |
| JP | 2007-179707 | 7/2007 |
| JP | 2007-214830 | 8/2007 |
| JP | 2007-310837 | 11/2007 |
| JP | 2007-325248 | 12/2007 |
| JP | 2008-78961 | 4/2008 |
| JP | 2008-098803 | 4/2008 |

OTHER PUBLICATIONS

Big Screen Mania, the 96th: International CES special edition, Japan, reported by Zenji Nishikawa, Impress Watch Corporation, Jan. 14, 2008, URL, http:av.watch.impress.co.jp/docs/20080114/dg96.htm.

* cited by examiner

*Primary Examiner*—M. Lee
(74) *Attorney, Agent, or Firm*—Blakely, Sokoloff, Taylor & Zafman LLP

(57) ABSTRACT

According to one embodiment, a video display apparatus includes a video reception module, a resolution processing module, and a notification module. The video reception module receives a video signal of a first resolution from an external apparatus. The resolution processing module generates a video signal of a second resolution higher than the first resolution by creating new pixel values from the video signal of the first resolution. The notification module transmits a notification indicating that the video display apparatus comprises the resolution processing module to the external apparatus.

8 Claims, 3 Drawing Sheets

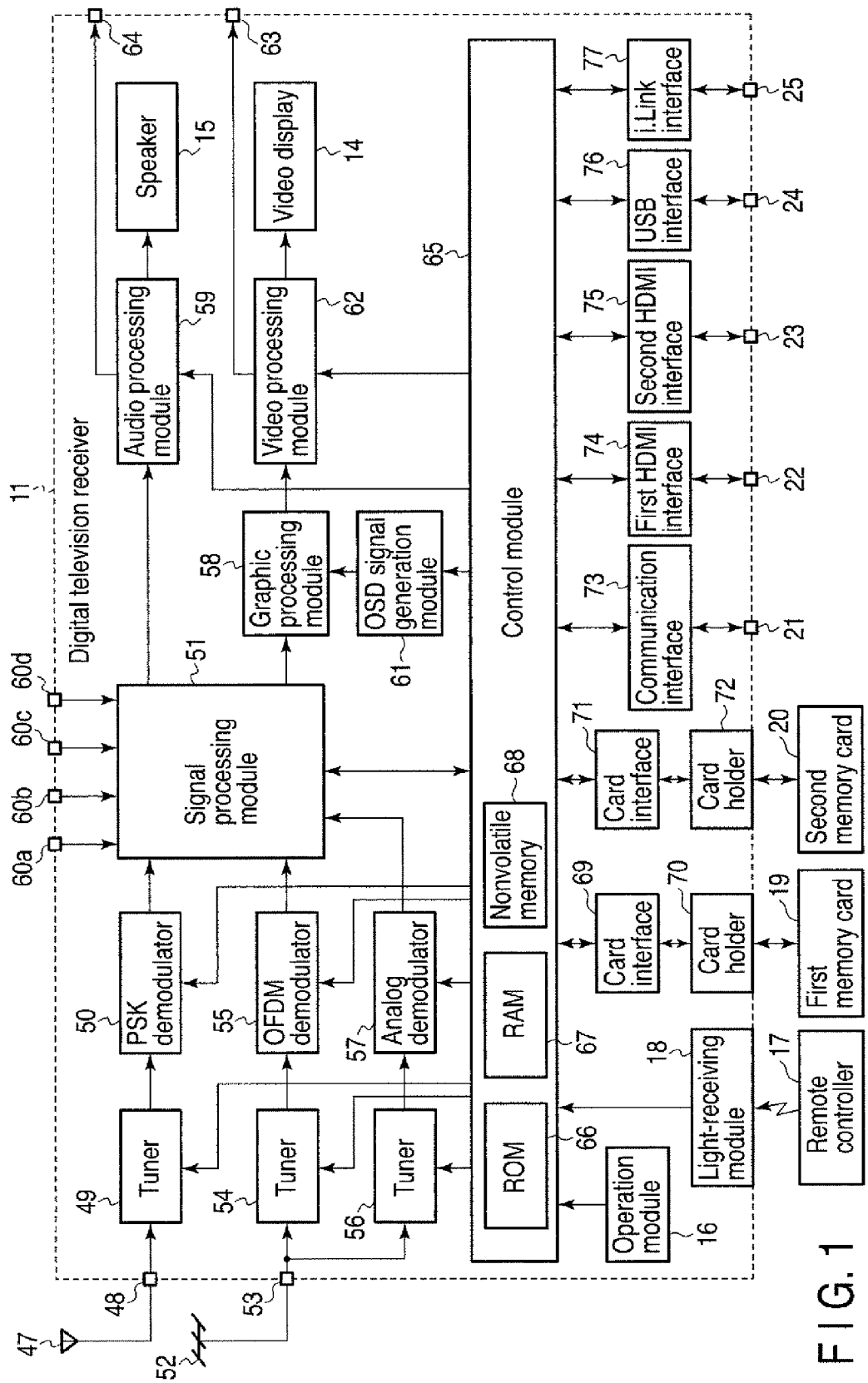
F I G. 1

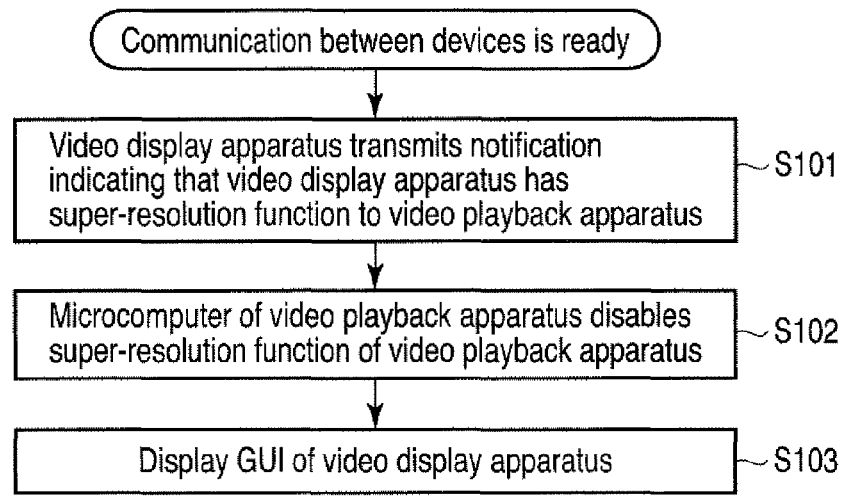
F I G. 4
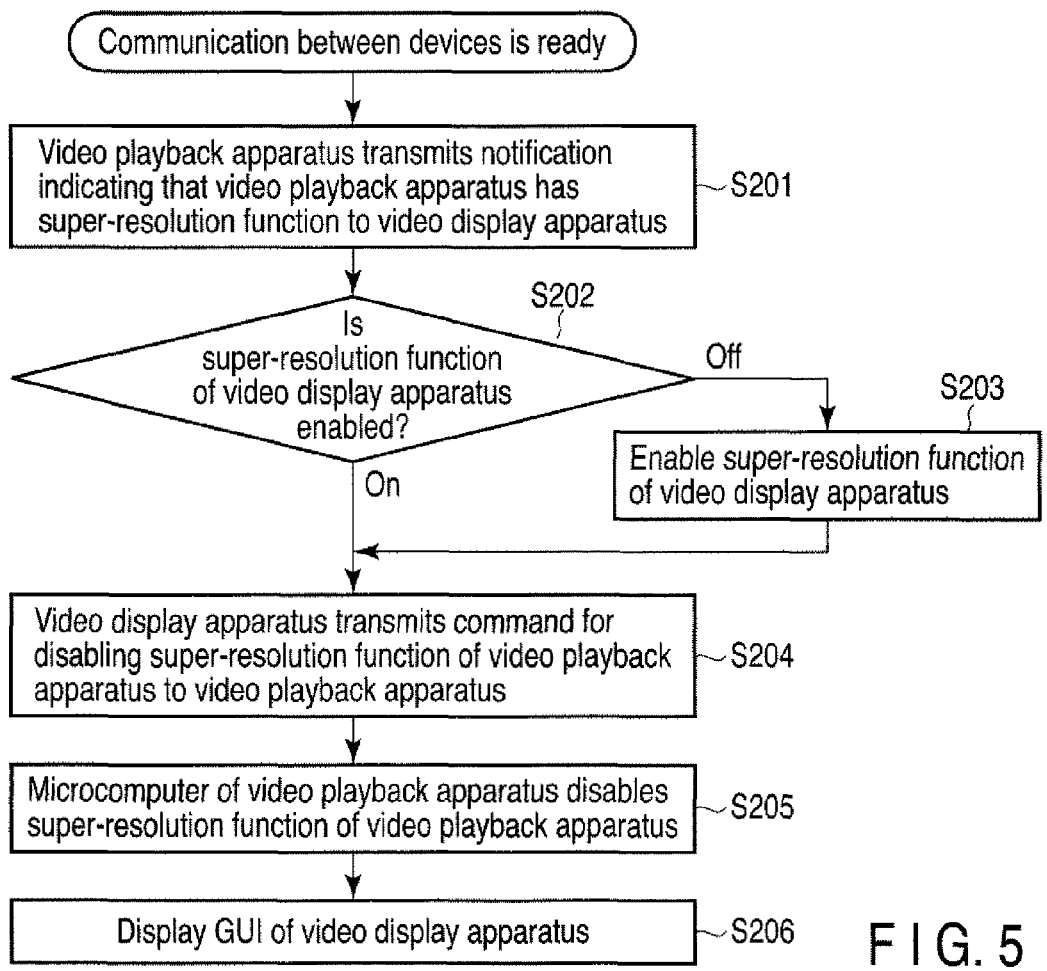
F I G. 5

VIDEO DISPLAY APPARATUS AND VIDEO DISPLAY METHOD

CROSS-REFERENCE TO RELATED APPLICATIONS

This application is based upon and claims the benefit of priority from Japanese Patent Application No. 2008-221479, filed Aug. 29, 2008, the entire contents of which are incorporated herein by reference.

BACKGROUND

1. Field

One embodiment of the invention relates to a video display apparatus having a super-resolution function, and a video display method.

2. Description of the Related Art

In recent years, the opportunity to view video content using personal computer displays having resolutions exceeding standard definition (SD) is increasing. Also, since high-definition (HD) television broadcasting has begun full rollout, television receivers compatible with the HD standard are becoming common in homes.

Compared to video display apparatuses with such high resolutions, video data captured by image pick-up devices such as video cameras, television broadcast data compatible with the SD standard, DVD, and the like have low resolutions. For this reason, such video data need to be converted into high-resolution data by an arbitrary method. Also, upon displaying a part of a video picture in an enlarged scale or upon picking-up an image by a video camera using digital zooming beyond optical zooming, high-resolution conversion is needed.

Conventionally, in order to achieve such high-resolution conversion, linear interpolation or interpolation based on cubic convolution is used, but such method suffers a problem of insufficient sharpness. To solve this problem, the studies of a super-resolution technique for generating an image that exceeds an original resolution of an image by generating new pixel value data between neighboring pixels to create high frequency components and by sharpening the image have been made. Also, development for embedding a super-resolution function in the aforementioned video input and output devices has been made. Therefore, prevalence of video display apparatuses, video playback apparatuses, and the like having the super-resolution function are expected in the future.

Jpn. Pat. Appln. KOKAI Publication No. 2007-179707 discloses a video/audio playback system which is configured by combining a TV, AV amplifier, DVD player, and the like, and automatically sets the devices that configure the system in optimal operation states in accordance with the presence/absence of video and audio signals and the format of contents recorded in an optical disc to be played back. The user can view the contents in an optimal state by only playing back the optical disc without any special instructions.

However, the video/audio playback system disclosed in Jpn. Pat. Appln. KOKAI Publication No. 2007-179707 controls the devices that configure the system based on the format of contents, but it does not control the respective devices based on functions of the respective devices. For this reason, when both the video display apparatus and video playback apparatus have the aforementioned super-resolution function, super-resolution conversion processing having a sharpening effect is doubly applied to a video picture to be played back. In this case, deterioration of video quality due to noise and over-emphasis of edges may occur.

In order to prevent such deterioration, the control that allows only one of the video display apparatus and video playback apparatus to execute the super-resolution conversion processing has to be made.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary block diagram showing the arrangement of a digital television receiver as an example of a video display apparatus according to one embodiment of the present invention;

FIG. 4 is an exemplary flowchart showing the operation when the video display apparatus according to the embodiment transmits a notification indicating that the video display apparatus has a super-resolution function to the video playback apparatus; and FIG. 5 is an exemplary flowchart showing the operation when the video display apparatus according to the embodiment receives, from the video playback apparatus, a notification indicating that the video playback apparatus has a super-resolution function.

DETAILED DESCRIPTION

Figure 2:
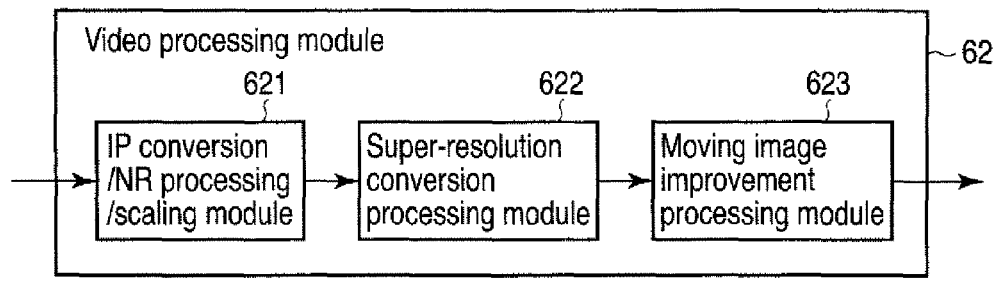
FIG. 2 is an exemplary block diagram showing the arrangement of a video processing module in the video display apparatus according to the embodiment.

Various embodiments according to the invention will be described hereinafter with reference to the accompanying drawings. In general, according to one embodiment of the invention, there is provided a video display apparatus comprises a video reception module, a resolution processing module, and a notification module. The video reception module receives a video signal of a first resolution from an external apparatus. The resolution processing module generates a video signal of a second resolution higher than the first resolution by creating new pixel values from the video signal of the first resolution. The notification module transmits a notification indicating that the video display apparatus comprises the resolution processing module to the external apparatus.

A digital television receiver as an example of a video display apparatus according to one embodiment of the present invention will be described below with reference to FIG. 1.

A digital television receiver 11 includes a video display 14, speaker 15, operation module 16, light-receiving module 18, card holders 70 and 72, LAN terminal 21, HDMI terminals 22 and 23, USB terminal 24, i.Link terminal 25, broadcast signal input terminals 48 and 53, analog signal input terminals 60a to 60d, output terminals 63 and 64, tuners 49, 54, and 56, card interfaces 69 and 71, communication interface 73, first HDMI interface 74, second HDMI interface 75, USB interface 76, i.Link interface 77, PSK demodulator 50, OFDM demodulator 55, analog demodulator 57, signal processing module 51, audio processing module 59, graphic processing module 58, OSD signal generation module 61, video processing module 62, and control module 65.

To the broadcast signal input terminals 48 and 53, a BS/CS digital broadcast receiving antenna 47 and a terrestrial broadcast receiving antenna 52 are respectively connected. The light-receiving module 18 receives an optical signal output from a remote controller 17. To the card holders 70 and 72, a first memory card 19 and second memory card 20 are respectively attached.

The control module 65 controls the operations of the respective modules in the digital television receiver 11. The control module 65 incorporates a CPU and the like, and includes a ROM 66, RAM 67, and nonvolatile memory 68. The ROM 66 stores a control program to be executed by the CPU incorporated in the control module 65. The nonvolatile memory 68 stores various kinds of setting information and control information. The CPU loads instructions and data required for processing onto the RAM 67, and executes the processing.

The control module 65 receives operation information by the operation module 16 or that by the remote controller 17 received by the light-receiving module 18. The control module 65 controls the respective modules in the digital television receiver 11 by reflecting the operations.

The control module 65 can exchange information with the first memory card 19 attached to the card holder 70 via the card interface 69. Likewise, the control module 65 can exchange information with the second memory card 20 attached to the card holder 72 via the card interface 71.

The control module 65 is connected to the LAN terminal 21 via the communication interface 73. As a result, the control module 65 can exchange information with, for example, a LAN-supported HDD connected to the LAN terminal 21 via the communication interface 73. In this case, the control module 65 has a Dynamic Host Configuration Protocol (DHCP) server function, and controls the LAN-supported HDD connected to the LAN terminal 21 by assigning an Internet Protocol (IP) address to that HDD.

The control module 65 is connected to the first HDMI terminal 22 via the first HDMI interface 74. As a result, the control module 65 can exchange information with respective devices connected to the first HDMI terminal 22 via the first HDMI interface 74. Likewise, the control module 65 is connected to the second HDMI terminal 23 via the second HDMI interface 75. As a result, the control module 65 can exchange information with respective devices connected to the second HDMI terminal 23 via the second HDMI interface 75. Devices connected to the HDMI terminals 22 and 23 include, for example, an AV amplifier, DVD recorder, DVD player, PC, and broadband router.

The control module 65 is connected to the USB terminal 24 via the USB interface 76. As a result, the control module 65 can exchange information with respective devices connected to the USB terminal 24 via the USB interface 76. Devices connected to the USB terminal 24 include a portable phone, digital camera, card reader/writer, HDD, and keyboard.

The control module 65 is connected to the i.Link terminal 25 via the i.Link interface 77. As a result, the control module 65 can exchange information with respective devices connected to the i.Link terminal 25 via the i.Link interface 77. Devices connected to the i.Link terminal 25 include an AV-HDD.

The BS/CS digital broadcast receiving antenna 47 receives a satellite digital television broadcast signal, and sends the received broadcast signal to the satellite digital broadcast tuner 49 via the input terminal 48. The tuner 49 tunes a broadcast signal of a channel of user's choice from this broadcast signal.

The phase shift keying (PSK) demodulator 50 demodulates the broadcast signal tuned by the tuner 49 to digital video and audio signals, and outputs these demodulated signals to the signal processing module 51.

The terrestrial broadcast receiving antenna 52 receives a terrestrial digital television broadcast signal, and a terrestrial analog television broadcast signal. The terrestrial digital television broadcast signal is sent to the terrestrial digital television broadcast tuner 54 via the input terminal 53. The tuner 54 tunes a broadcast signal of a channel of user's choice from this broadcast signal. The orthogonal frequency division multiplexing (OFDM) demodulator 55 demodulates the broadcast signal tuned by the tuner 54 to digital video and audio signals, and outputs these demodulated signals to the signal processing module 51.

On the other hand, the terrestrial analog television broadcast signal is sent to the terrestrial analog television broadcast tuner 56 via the input terminal 53. The tuner 56 tunes a broadcast signal of a channel of user's choice from this broadcast signal. The analog demodulator 57 demodulates the broadcast signal tuned by the tuner 56 into analog video and audio signals, and outputs these signals to the signal processing module 51.

The signal processing module 51 applies predetermined digital signal processing to the digital video and audio signals output from the PSK demodulator 50 or OFDM demodulator 55, and outputs the processed signals to the graphic processing module 58 and audio processing module 59.

To the signal processing module 51, the plurality of input terminals 60a, 60b, 60c, and 60d are connected. These input terminals 60a to 60d allow to input external analog video and audio signals to the digital television receiver 11.

The signal processing module 51 converts analog video and audio signals output from the analog demodulator 57 or the input terminals 60a to 60d into digital video and audio signals. The signal processing module 51 then applies predetermined digital signal processing to the digital video and audio signals, and outputs the processed signals to the graphic processing module 58 and audio processing module 59.

The graphic processing module 58 superimposes an on-screen display (OSD) signal of a menu or the like generated by the OSD signal generation module 61 onto the digital video signal output from the signal processing module 51, and outputs the superimposed signal. This graphic processing module 58 can also selectively output a video signal as the output from the signal processing module 51 and an OSD signal as the output from the OSD signal generation module 61.

The digital video signal output from the graphic processing module 58 is input to the video processing module 62. The video processing module 62 applies high-image quality conversion processing such as super-resolution conversion processing to the input digital video signal.

FIG. 2 shows the arrangement of the video processing module 62. The video processing module 62 includes an interlaced/progressive (IP) conversion/noise reduction (NR) processing/scaling module 621, super-resolution conversion processing module 622, and moving image improvement processing module 623. The super-resolution conversion processing module 622 generates a video signal of a second resolution by creating new pixel values from a video signal of a first resolution lower than the second resolution. That is, "generating a video signal of a second resolution from a video signal of a first resolution lower than the second resolution"

translates to restoring an image of the second resolution from an image of the first resolution. The super-resolution conversion processing module 622 executes sharpening processing for restoring an image signal of the second resolution by increasing the number of pixels by estimating original pixel values from an image signal of the first resolution. Note that "original pixel values" indicates values of respective pixels of an image signal obtained when a camera of the high resolution (second resolution) picks up an image of the same object as that when the image signal of the low resolution (first resolution) is obtained. Also, "increasing the number of pixels by estimation" means that original pixel values are estimated based on an intra-frame image or inter-frame images with a high correlation by detecting a feature of a target image, and these pixel values are determined as those which are to be associated with new pixels. That is, the image correlation is used. In other words, "increasing the number of pixels by estimating original pixel values" means restoring picture quality by creating high frequency pixels. Note that the super-resolution conversion processing module 622 can use known techniques disclosed in, for example, Jpn. Pat. Appln. KOKAI Publication Nos. 2007-310837, 2008-98803, and 2000-188680. As the technique for the super-resolution conversion processing module 622 of this embodiment, for example, a technique for restoring an image having frequency components higher than a Nyquist frequency determined by the sampling period of an input image can be used.

For example, when super-resolution conversion processing disclosed in Jpn. Pat. Appln. KOKAI Publication No. 2007-310837 is used, a plurality of corresponding points corresponding to a plurality of image regions of interest closest to a change pattern of pixel values in an image region of interest including a pixel of interest in a frame with respect to a plurality of middle-resolution frames are selected from a reference frame. A luminance sample value at the corresponding point is set to be a pixel value of the pixel of interest corresponding to that corresponding point. Then, based on the magnitudes of a plurality of sample values and the layout of the plurality of corresponding points, pixel values of a high-resolution frame having the number of pixels larger than that of the reference frame and that corresponding to the reference frame are calculated. As a result, the number of pixels is increased by estimating original pixel values from an image signal of a low resolution, and an image signal of a high resolution is restored.

On the other hand, when super-resolution conversion processing using a self-congruent position search in a single frame image disclosed in Jpn. Pat. Appln. KOKAI Publication No. 2008-98803 is used, a first pixel position with a minimum error is calculated by comparing errors of respective pixels in a search region of a middle-resolution frame, and a position with a minimum error in the search region is calculated to a decimal precision based on the first pixel position, a first error at that position, second pixel position around the first pixel, and a second error at that position. Then, a decimal precision vector having this position as an end point and a pixel of interest as a start point is calculated, and an extrapolation vector of the decimal precision vector, having a pixel on a screen, which is not included in the search region, as an end point, is calculated using the decimal precision vector. Then, based on the decimal precision vector, extrapolation vector, and pixel values acquired from image signal, pixel values of a high-resolution image having the number of pixels larger than that included in the image signal are calculated. The super-resolution conversion processing module 622 increases the number of pixels by estimating original pixel values from an image signal of a low resolution by executing the aforementioned processing, thereby restoring an image signal of a high resolution.

Also, super-resolution conversion processing that uses mapping between a plurality of frame images disclosed in Jpn. Pat. Appln. KOKAI Publication No. 2000-188680 can be used.

However, the method of the super-resolution conversion processing in the super-resolution conversion processing module 622 is not limited to the aforementioned methods, and any other super-resolution conversion processing methods can be applied in addition to processes for generating an image signal of a high resolution by increasing the number of pixels by estimating new pixel values from an image signal of a low resolution.

The video processing module 62 converts the digital video signal that has undergone the super-resolution conversion processing into an analog video signal as a format that can be displayed by the video display 14, and outputs the analog video signal to the video display 14. The video processing module 62 externally outputs the analog video signal via the output terminal 63. The video display 14 displays a video picture based on the analog video signal output from the video processing module 62.

The audio processing module 59 converts the input digital audio signal into an analog audio signal as a format that can be played back by the speaker 15, and outputs the analog audio signal to the speaker 15. The speaker 15 plays back an audio based on the analog audio signal. The audio processing module 59 further externally outputs the analog audio signal via the output terminal 64.

Figure 3:
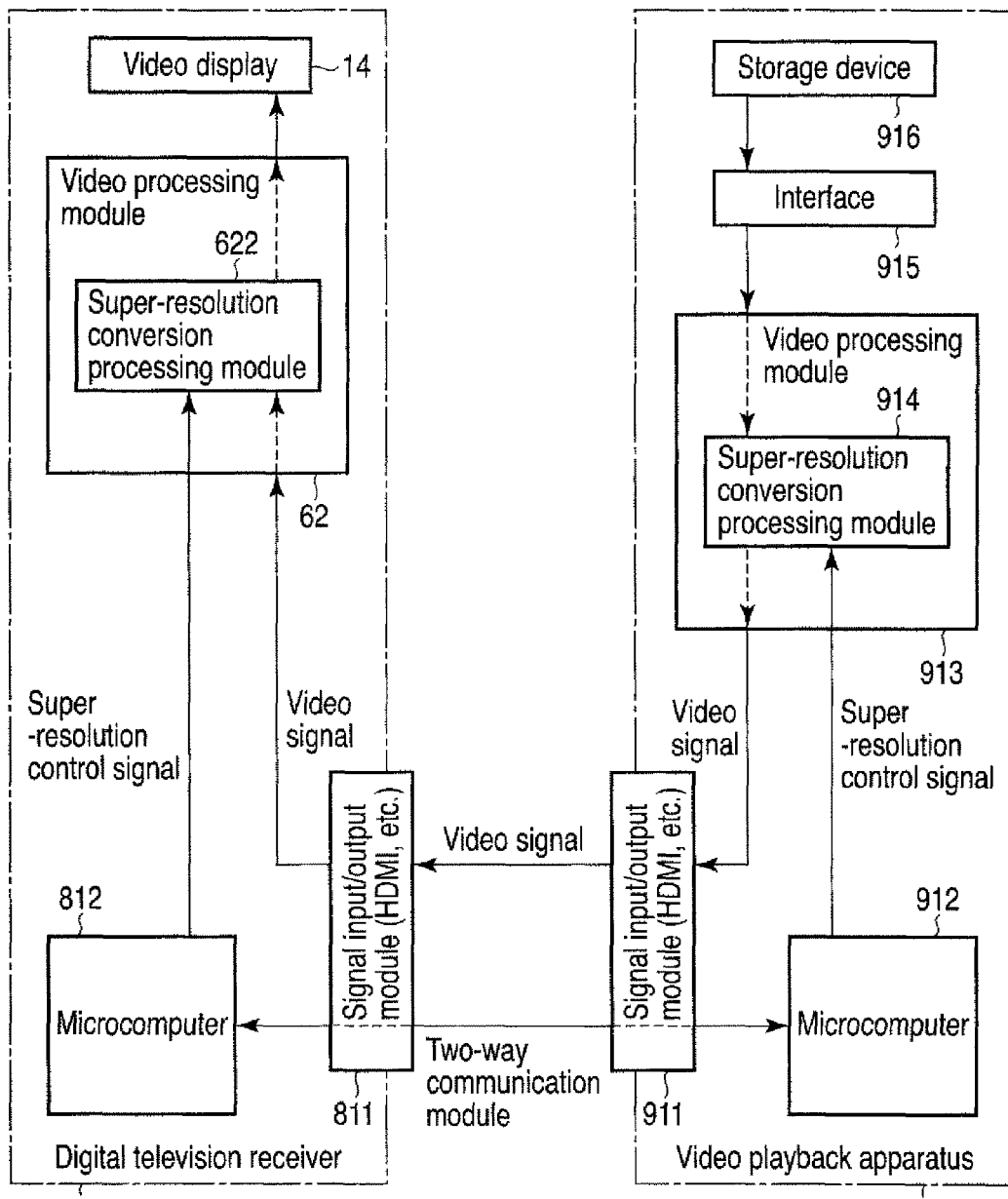
FIG. 3 is an exemplary block diagram showing the execution control of super-resolution conversion processing when a video playback apparatus is connected to the video display apparatus according to the embodiment.

FIG. 3 is a block diagram when a video playback apparatus 91 is connected to the digital television receiver 11 of this embodiment. Both the digital television receiver 11 and video playback apparatus 91 have a super-resolution function as a function of applying super-resolution conversion processing to a video signal. For this reason, when a video signal that has undergone the super-resolution conversion processing in the video playback apparatus 91 is input to the digital television receiver 11, and the digital television receiver 11 applies the super-resolution conversion processing to that video signal again, deterioration of video quality due to noise and overemphasis of edges may occur.

The digital television receiver 11 of this embodiment executes control to allow only one of the digital television receiver 11 and video playback apparatus 91 to execute the super-resolution conversion processing. The operations of the digital television receiver 11 and video playback apparatus 91 will be described below with reference to FIG. 3. Note that the digital television receiver 11 is configured by the respective modules shown in FIG. 1 above. However, FIG. 3 simply illustrates components which operate when the video playback apparatus 91 is connected and the control of the super-resolution conversion processing is executed.

The digital television receiver 11 and video playback apparatus 91 are connected via an interface complying with, e.g., the High-Definition Multimedia Interface (HDMI) standard (to be referred to as an HDMI interface hereinafter). With this HDMI interface, the digital television receiver 11 and video playback apparatus 91 perform video signal communication. The HDMI standard further defines the Consumer Electronics Control (CEC) standard. Therefore, the HDMI interface includes a two-way communication module of control information and the like, which complies with the CEC.

In FIG. 3, the digital television receiver 11 includes a signal input/output module 811, microcomputer 812, the video processing module 62, and the video display 14.

The signal input/output module 811 controls a communication with the video playback apparatus 91. The signal input/output module 811 receives a video signal and control signal transmitted from the video playback apparatus 91, and transmits a control signal to the video playback apparatus 91. The signal input/output module 811 sends the received video signal to the video processing module 62, and sends a super-resolution control signal which enables/disables the super-resolution function to the microcomputer 812. The signal input/output module 811 transmits, to the video playback apparatus 91, a control signal sent from the microcomputer 812.

The microcomputer 812 exchanges a super-resolution control signal that enables/disables the super-resolution function with the video playback apparatus 91 via the signal input/output module 811. The microcomputer 812 controls whether or not the video processing module 62 executes super-resolution conversion of a video signal using the super-resolution conversion processing module 622.

The video processing module 62 causes the super-resolution conversion processing module 622 to execute super-resolution conversion of the video signal sent from the signal input/output module 811 under the control of the microcomputer 812. That is, upon reception of a super-resolution control signal that enables the super-resolution conversion processing module 622 from the microcomputer 812, the video processing module 62 executes the super-resolution conversion processing to the video signal. On the other hand, upon reception of a super-resolution control signal that disables the super-resolution conversion processing module 622 from the microcomputer 812, the video processing module 62 skips execution of the super-resolution conversion processing to the video signal.

The video display 14 displays a video signal output from the video processing module 62 on a screen.

The video playback apparatus 91 is, for example, a DVD player or a set-top box. The video playback apparatus 91 includes a storage device 916, interface 915, microcomputer 912, video processing module 913, and signal input/output module 911. The video processing module 913 includes a super-resolution conversion processing module 914 which executes the same processing as the super-resolution conversion processing module 622.

The storage device 916 is a DVD or hard disk drive which stores a video signal to be played back by the video playback apparatus 91. The storage device 916 outputs the stored video signal via the interface 915. When the storage device 916 is a DVD, a DVD drive serves as the interface 915. When the storage device 916 is a hard disk drive, a hard disk controller serves as the interface 915.

The microcomputer 912 exchanges a control signal with the digital television receiver 11 via the signal input/output module 911. Also, the microcomputer 912 controls whether or not the video processing module 913 executes super-resolution conversion of a video signal using the super-resolution conversion processing module 914.

The video processing module 913 executes super-resolution conversion processing to a video signal sent from the storage device 916 via the interface 915 using the super-resolution conversion processing module 914 under the control of the microcomputer 912. That is, upon reception of a super-resolution control signal that enables the super-resolution conversion processing module 914 from the microcomputer 912, the video processing module 913 executes the super-resolution conversion processing to the video signal. On the other hand, upon reception of a super-resolution control signal that disables the super-resolution conversion pro-cessing module 914 from the microcomputer 912, the video processing module 913 skips execution of the super-resolution conversion processing to the video signal.

The signal input/output module 911 controls a communication with the digital television receiver 11. The signal input/output module 911 receives a control signal transmitted from the digital television receiver 11, and transmits a video signal and control signal to the digital television receiver 11. The signal input/output module 911 sends a super-resolution control signal that enables/disables the super-resolution function to the microcomputer 912. The signal input/output module 911 transmits a super-resolution control signal sent from the microcomputer 912 to the digital television receiver 11.

In the aforementioned case, the microcomputer 812 enables/disables the super-resolution function in the super-resolution conversion processing module 622, and the microcomputer 912 enables/disables the super-resolution function in the super-resolution conversion processing module 914. When the super-resolution function is disabled by these operations, the super-resolution conversion processing modules 622 and 914 skip the super-resolution conversion processing. More specifically, the super-resolution conversion processing modules 622 and 914 do not pass any video signal through them (hardware through). Alternatively, these modules 622 and 914 pass the video signal through them but set parameters for the super-resolution conversion processing to have no effect (software through). That is, the super-resolution function is disabled by inputting no video signal to the super-resolution conversion processing modules 622 and 914 or by inputting a video signal to these modules 622 and 914 but setting parameters for the super-resolution conversion processing to have no effect (by setting a sharpening gain to be zero without raising it or skipping restoration processing). In the software through mode, the super-resolution conversion processing may be executed to set parameters weaker than normal in place of zero so as not to adversely influence a video signal.

The operations when the digital television receiver 11 and video playback apparatus 91 are connected will be described below.

When the signal input/output module 811 of the digital television receiver 11 and the signal input/output module 911 of the video playback apparatus 91 are connected via, e.g., HDMI, the digital television receiver 11 detects connection of the video playback apparatus 91. Also, the video playback apparatus 91 detects connection of the digital television receiver 11.

The microcomputer 812 of the digital television receiver 11 and the microcomputer 912 of the video playback apparatus 91 notify each other of the presence/absence of the super-resolution function in the respective apparatuses. This notification uses, e.g., a two-way communication module complying with the HDMI-CEC, as described above. Note that this notification may be made after connection between the digital television receiver 11 and video playback apparatus 91 is detected and after the digital television receiver 11 receives a control signal which is transmitted from the video playback apparatus 91 and inquires about the presence/absence of the super-resolution function, or after the video playback apparatus 91 receives a control signal which is transmitted from the digital television receiver 11 and inquires about the presence/absence of the super-resolution function.

When the digital television receiver 11 determines based on this notification that the video playback apparatus 91 also has the super-resolution function, it executes control to allow only one of the digital television receiver 11 and video playback apparatus 91 to execute the super-resolution conversion processing. That is, when the super-resolution conversion processing by the super-resolution conversion processing module 622 is to be executed in the digital television receiver 11, the super-resolution conversion processing module 914 is disabled in the video playback apparatus 91 to skip execution of the super-resolution conversion processing. On the other hand, when the super-resolution conversion processing by the super-resolution conversion processing module 914 is to be executed in the video playback apparatus 91, the super-resolution conversion processing module 622 is disabled in the digital television receiver 11 to skip execution of the super-resolution conversion processing.

FIGS. 4 and 5 are flowcharts showing operation examples when both the digital television receiver 11 and video playback apparatus 91 have the super-resolution conversion function, but only the digital television receiver 11 executes the super-resolution conversion processing.

FIG. 4 shows the operation when the digital television receiver 11 sends a notification indicating that it has the super-resolution function to the video playback apparatus 91.

When the digital television receiver 11 and video playback apparatus 91 are connected to each other to allow two-way communication between the two apparatuses, the digital television receiver 11 transmits a notification indicating that it has the super-resolution function to the video playback apparatus 91 (block S101). Upon reception of this notification, the video playback apparatus 91 controls the microcomputer 912 to disable the super-resolution function (block S102). That is, the microcomputer 912 disables the super-resolution conversion processing module 914. Then, the digital television receiver 11 displays a message indicating that the super-resolution function of the video playback apparatus 91 is disabled to the user via a GUI (block S103).

Note that the notification indicating that the digital television receiver 11 has the super-resolution function in block S101 may be transmitted after the digital television receiver 11 receives a control signal which is transmitted from the video playback apparatus 91 and inquires about the presence/absence of the super-resolution function in place of automatic notification from the digital television receiver 11 to the video playback apparatus 91.

In the operation shown in FIG. 4, it has to be set in the video playback apparatus 91 in advance that the video playback apparatus 91 which received the notification indicating that the digital television receiver 11 has the super-resolution function executes processing for disabling its super-resolution function.

In the operation shown in FIG. 4, the digital television receiver 11 transmits a notification to the video playback apparatus 91 first. FIG. 5 shows the operation when the video playback apparatus 91 transmits a notification indicating that it has the super-resolution function to the digital television receiver 11.

When the digital television receiver 11 and video playback apparatus 91 are connected to each other to allow two-way communication between the two apparatuses, the video playback apparatus 91 transmits a notification indicating that it has the super-resolution function to the digital television receiver 11 (block S201). Upon reception of this notification, the digital television receiver 11 controls the microcomputer 812 to determine if the super-resolution function of the digital television receiver 11 is enabled (block S202). If the super-resolution function of the digital television receiver 11 is disabled (OFF in block S202), the microcomputer 812 enables the super-resolution function of the digital television receiver 11 (block S203). That is, the microcomputer 812 enables the super-resolution conversion processing module 622. Note that the microcomputer 812 may enable the super-resolution conversion processing module 622 in response to a user's operation.

If the super-resolution function of the digital television receiver 11 is enabled (ON in block S202) or if the super-resolution function of the digital television receiver 11 is enabled in block S203, the digital television receiver 11 transmits a command for disabling the super-resolution function of the video playback apparatus 91 to the video playback apparatus 91 (block S204). Upon reception of this command, the video playback apparatus 91 controls the microcomputer 912 to disable its super-resolution function (block S205). That is, the microcomputer 912 disables the super-resolution conversion processing module 914. Then, the digital television receiver 11 displays a message indicating that the super-resolution function of the video playback apparatus 91 is disabled to the user via a GUI (block S206).

Note that the notification indicating that the video playback apparatus 91 has the super-resolution function in block S201 may be transmitted after the video playback apparatus 91 receives a control signal which is transmitted from the digital television receiver 11 and inquires about the presence/absence of the super-resolution function in place of automatic notification from the video playback apparatus 91 to the digital television receiver 11.

As a result of the operation shown in FIG. 4 or 5, the digital television receiver 11 displays a video picture that has undergone the super-resolution conversion processing by only the digital television receiver 11. That is, the super-resolution conversion processing can be avoided from being doubly applied to a video picture, thus preventing deterioration of video quality. Since the aforementioned operation is automatically done at the time of detection of connection between the digital television receiver 11 and video playback apparatus 91, the user need not manually disable the super-resolution function of either apparatus.

The operation examples shown in FIGS. 4 and 5 can be appropriately selected and applied based on the actual device arrangements, type of usage, and the like. In the operation examples shown in FIGS. 4 and 5, the super-resolution conversion processing is avoided from being doubly applied to a video signal by disabling the super-resolution function in the video playback apparatus 91. Alternatively, the super-resolution conversion processing may be avoided from being doubly applied to a video picture by disabling the super-resolution function in the digital television receiver 11. Such modification can be implemented when the digital television receiver 11 receives a notification indicating that the video playback apparatus 91 has the super-resolution function from the video playback apparatus 91, and disables its super-resolution function.

As described above, according to this embodiment, when both the video display apparatus and video playback apparatus have the super-resolution function for a video signal, the control to allow either one of the video display apparatus and video playback apparatus to execute the super-resolution conversion processing is made. This control is attained when the video display apparatus transmits a notification indicating that it has the super-resolution function to the video playback apparatus, and the video playback apparatus disables its super-resolution function or when the video display apparatus transmits a control signal for disabling the super-resolution function to the video playback apparatus. As a result, the super-resolution conversion processing can be avoided from being doubly applied to a video picture to be displayed on the video display apparatus in both the video display apparatus and video play back apparatus, thus preventing deterioration of video quality.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A video display apparatus comprising:
   a video reception module configured to receive a video signal of a first resolution from an external video reproduction apparatus, the video signal having been subjected to sharpening processing;
   a super-resolution processing module configured to execute super-resolution conversion processing of generating a video signal of a second resolution higher than the first resolution by estimating an original pixel value to increase the number of pixels included in the video signal of the first resolution;
   a notification module configured to notify the external video reproduction apparatus that the video display apparatus comprises the super-resolution processing module; and
   a control module configured to execute control for weakening an effect of the sharpening processing of the external video reproduction apparatus, compared to a case where the video display apparatus does not comprise the super-resolution processing module.

2. The video display apparatus of claim 1, wherein the notification module is configured to notify that the video display apparatus comprises the super-resolution processing module, in response to connection of the external video reproduction apparatus.

3. A video display apparatus comprising:
   a video reception module configured to receive a video signal of a first resolution from an external video reproduction apparatus;
   a super-resolution processing module configured to execute super-resolution conversion processing for generating a video signal of a second resolution higher than the first resolution by estimating an original pixel value to increase the number of pixels included in the video signal of the first resolution;
   an information reception module configured to receive information indicating whether or not the external video reproduction apparatus comprises a function of executing sharpening processing; and
   a control signal output module configured to supply the external video reproduction apparatus with a control signal for weakening an effect of the sharpening processing of the external video reproduction apparatus, compared to a case where the video display apparatus does not comprise the super-resolution processing module, when the information indicates that the external video reproduction apparatus comprises the function of executing the sharpening processing.

4. The video display apparatus of claim 3, wherein the information reception module is configured to receive the information in response to connection of the external video reproduction apparatus.

5. The video display apparatus of claim 4, wherein the control signal output module is configured to output the control signal in response to reception of information indicating that the external video reproduction apparatus comprises the function of executing the sharpening processing.

6. A video display method comprising:
   receiving a video signal of a first resolution from an external video reproduction apparatus, the video signal having been subjected to sharpening processing;
   executing super-resolution conversion processing for generating a video signal of a second resolution higher than the first resolution by estimating an original pixel value to increase the number of pixels included in the video signal of the first resolution;
   notifying the external video reproduction apparatus that a function of the super-resolution conversion processing is included; and
   executing control for weakening an effect of the sharpening processing of the external video reproduction apparatus, compared to a case where the super-resolution conversion processing is not executed.

7. The video display method of claim 6, wherein the notifying comprising notifying that the function of the super-resolution conversion processing is included, in response to connection of the external video reproduction apparatus.

8. A video reproduction apparatus comprising:
   a sharpening module configured to subject a video signal to sharpening processing;
   a video output module configured to supply an external video reproduction apparatus with the video signal subjected to the sharpening processing;
   an information reception module configured to receive information indicating whether or not the external video reproduction apparatus comprises a function of executing super-resolution conversion processing; and
   a control module configured to execute control for weakening an effect of the sharpening processing compared to a case where the external video reproduction apparatus does not comprise a function of executing super-resolution conversion processing, when the information indicates that the external video reproduction apparatus comprises the function of executing the super-resolution conversion processing.

* * * * *